(12) United States Patent
Dong

(10) Patent No.: US 7,522,200 B2
(45) Date of Patent: Apr. 21, 2009

(54) ON-CHIP DEAD PIXEL CORRECTION IN A CMOS IMAGING SENSOR

(75) Inventor: Kimble Dong, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 659 days.

(21) Appl. No.: 10/684,706

(22) Filed: Oct. 14, 2003

(65) Prior Publication Data

US 2004/0080636 A1     Apr. 29, 2004

Related U.S. Application Data

(63) Continuation of application No. 09/082,355, filed on May 20, 1998, now Pat. No. 6,665,009.

(51) Int. Cl.
*H04N 9/64*     (2006.01)
(52) U.S. Cl. ........................ 348/246; 348/247
(58) Field of Classification Search .................. 348/247
See application file for complete search history.

(56) References Cited

U.S. PATENT DOCUMENTS

| | | | |
|---|---|---|---|
| 4,513,312 A | 4/1985 | Takemura | |
| 4,542,409 A | 9/1985 | Ochi | |
| 4,652,911 A | 3/1987 | Teranishi et al. | |
| 4,686,373 A | 8/1987 | Tew et al. | |
| 4,805,023 A | 2/1989 | Younse et al. | |

(Continued)

OTHER PUBLICATIONS

Ackland, Bryan and Dickinson, Alex, "Camera on a Chip", Feb. 8, 1996, Solid-State Circuits Conference, 1996. Digest of Technical Papers. 43rd ISSCC., 1996 IEEE International.*

(Continued)

*Primary Examiner*—Yogesh Aggarwal
(74) *Attorney, Agent, or Firm*—Blakely Sokoloff Taylor & Zafman LLP

(57) ABSTRACT

In a MOS imaging array, dead pixels may occur in that if the cell of the pixel has a defect in its PN junction, it may generate current leakage paths, thus causing the cell site to appear as a white spot in the image signal. The number of dead pixels on a CMOS image sensor is dependent on the process quality used for forming the image sensor. The present invention corrects for dead pixels with circuitry that may be fabricated on a single integrated MOS chip. When the MOS imaging device is first turned on, the pixel signals from the cell array are read out and a dead pixel determination method is used to determine dead pixels. A digital referencing scheme is used such that when a dead pixel is located, its digital location is stored in a designated storage area. Then normal data image signal processing begins, with the location of each pixel that is being read out being monitored. When a pixel with a location that corresponds to the stored location for a dead pixel is read out, the signal processing circuitry compensates for the pixel signal rather than providing it as part of the normal image signal. One method by which the signal processing circuitry may compensate for the dead pixel signal is to repeat the signal from the pixel that was read out immediately prior to the dead pixel.

9 Claims, 5 Drawing Sheets

U.S. PATENT DOCUMENTS

| | | | |
|---|---|---|---|
| 4,920,428 | A | 4/1990 | Lin et al. |
| 4,939,573 | A | 7/1990 | Teranishi et al. |
| 5,047,861 | A * | 9/1991 | Houchin et al. ............ 348/247 |
| 5,282,025 | A | 1/1994 | Sato |
| 5,345,266 | A | 9/1994 | Denyer |
| 5,392,070 | A | 2/1995 | Endo et al. |
| 5,436,659 | A | 7/1995 | Vincent |
| 5,471,515 | A | 11/1995 | Fossum et al. |
| 5,499,114 | A | 3/1996 | Compton |
| 5,781,233 | A * | 7/1998 | Liang et al. ............... 348/302 |
| 5,796,430 | A | 8/1998 | Katoh et al. |
| 5,886,353 | A * | 3/1999 | Spivey et al. ......... 250/370.09 |
| 6,340,989 | B1 | 1/2002 | Oda |
| 6,396,539 | B1 | 5/2002 | Heller et al. |
| 6,611,288 | B1 * | 8/2003 | Fossum et al. ............. 348/246 |
| 6,618,084 | B1 * | 9/2003 | Rambaldi et al. .......... 348/247 |
| 2002/0030753 | A1 | 3/2002 | Kramer et al. |

OTHER PUBLICATIONS

D. Cormier, "Solid-State Optical Sensors Improve Their Image," *ESD: The Electronic System Design Magazine*, Jan. 1989, pp. 36-42.

P. B. Denyer et al., "Intelligent CMOS Imaging," *Charge-Coupled Devices and Solid State Optical Sensors V*—SPIE Proceedings, San Jose, California, Feb. 1995, pp. 285-291.

E. R. Fossum, "Active Pixel Sensors: Are CCD's Dinosaurs?" *Charge-Coupled Devices and Solid State Optical Sensors III*—SPIE Proceedings, San Jose, California, Feb. 1993, pp. 2-14.

R. M. Hodgson, "Charge Transfer Devices and Their Application," *New Zealand Engineering*, vol. 34, No. 11, Nov. 15, 1979, pp. 246-249.

T. Imaide et al., "Single-Chip Color Cameras with Reduced Aliasing," *Journal of Imaging Technology*, vol. 12, No. 5, Oct. 1986, pp. 258-260.

H. Kawashima et al., "A ¼ Inch Format 250K Pixel Amplified MOS Image Sensor Using CMOS Process," *IEDM Technical Digest*, Dec. 5-8, 1993, pp. 575-578.

S. K. Mendis et al., "Progress in CMOS Active Pixel Image Sensors," *Charge-Coupled Devices and Solid State Optical Sensors IV*—SPIE Proceedings, San Jose, California, Feb. 1994, pp. 19-29.

R.H. Nixon et al., "128X128 CMOS Photodiode—Type Active Pixel Sensor with On-Chip Timing, Control and Signal Chain Electronics," *Charge-Coupled Devices and Solid State Optical Sensors V*—SPIE Proceedings, San Jose, California, Feb. 1995, pp. 117-123.

M. Onga et al., "New Signal-Processing LSIs for the 8mm Camcorder," *IEEE Transactions on Consumer Electronics*, vol. 36, No. 3, Aug. 1990, pp. 494-501.

T. Ozaki et al., "Low-Noise Line-Amplified MOS Imaging Devices," *IEEE Transactions on Electron Devices*, vol. 38, No. 5, May 1991, pp. 969-975.

K. A. Parulski, "Color Filters and Processing Alternatives for One-Chip Cameras," *IEEE Transactions on Electron Devices*, vol. ED-32, No. 8, Aug. 1985, pp. 1381-1389.

S. Tsururta et al., "Color Pixel Arrangement Evaluation for LC-TV," *Conference Record of the 1985 International Display Researh Conference*, San Diego, California, Oct. 1985, pp. 24-26.

T. Watanabe et al., "A CCD Color Signal Separation IC for Single-Chip Color Imagers," *IEEE Journal of Solid-State Circuits*, vol. SC-19, No. 1, Feb. 1984, pp. 49-54.

* cited by examiner

ON-CHIP DEAD PIXEL CORRECTION IN A CMOS IMAGING SENSOR

CROSS-REFERENCE TO RELATED APPLICATION(S)

This application is a continuation of U.S. patent application Ser. No. 09/082,355, filed on May 20, 1998, now U.S. Pat. No. 6,665,009 which is hereby incorporated by reference in its entirety.

FIELD OF THE INVENTION

The present invention relates to metal oxide semiconductor (MOS) imaging arrays and, more particularly, to a method for correcting for dead pixels in MOS imaging arrays.

BACKGROUND OF THE INVENTION

Integrated circuit technology has revolutionized various fields including computers, control systems, telecommunications, and imaging. In the field of imaging, the charge coupled device (CCD) sensor has made possible the manufacture of relatively low-cost and small hand-held video cameras. However, the solid-state CCD integrated circuits needed for imaging are relatively difficult to manufacture, and therefore are expensive. In addition, because of the differing processes involved in the manufacture of CCD integrated circuits relative to MOS integrated circuits, the signal processing portion of the imaging sensor has typically been located on a separate integrated chip. Thus, a CCD imaging device includes at least two integrated circuits: one for the CCD sensor and one for the signal processing logic.

An alternative low-cost technology to CCD integrated circuits is the metal oxide semiconductor (MOS) integrated circuit. Not only are imaging devices using MOS technology less expensive to manufacture relative to CCD imaging devices, for certain applications MOS devices are superior in performance. For example, the pixel elements in a MOS device can be made smaller and therefore provide a higher resolution than CCD image sensors. In addition, the signal processing logic necessary can be integrated alongside the imaging circuitry, thus allowing for a single integrated chip to form a complete stand-alone imaging device.

Examples of MOS imaging devices are detailed in "A ¼ Inch Format 250K Pixel Amplified MOS Image Sensor Using CMOS Process" by Kawashima et al., IEDM 93-575 (1993), and "A Low Noise Line-Amplified MOS Imaging Devices" by Ozaki et al., *IEEE Transactions on Electron Devices*, Vol. 38, No. 5, May 1991. In addition, U.S. Pat. No. 5,345,266 to Denyer titled "Matrix Array Image Sensor Chip" describes a MOS image sensor. The devices disclosed in these publications provide a general design approach to MOS imaging devices.

The primary building block of an image formed by an MOS imaging device is a pixel. The number, size, and spacing of the pixels determine the resolution of the image generated by the imaging device. The pixels of a MOS imaging device are semiconductor devices that transform incident light photons into current signals at an array cell, which may be a diode or gate cell. The signal produced by each pixel is generally extremely small, in the nanoampere range.

Although generally quite reliable, the pixels may from time to time exhibit anomalous behavior. For example, if the array cell of the pixel has a defect in its PN junction, it may generate current leakage paths, thus causing the cell site to appear as a white spot in the image signal. The pixel of such a cell site may be referred to as a "dead pixel." The number of dead pixels on a CMOS image sensor is dependent on the quality of the process used for forming the image sensor. In a high resolution sensor that has one million or more pixels, a number of dead pixels invariably result.

The present invention is directed to a method and apparatus that compensates for the foregoing and other problems of the prior art. More specifically, the present invention is directed to a method and apparatus for correcting for dead pixels in a CMOS image sensor.

SUMMARY OF THE INVENTION

A method for correcting for dead pixels in a CMOS image sensor is disclosed. According to the method, when the image sensor is first powered on, the pixel array is examined for dead pixels and the locations of any dead pixels that are found are digitally stored. Thereafter, as a given frame of the image sensor is scanned out, the location of the pixels in the frame are compared to the stored locations for dead pixels, and if a dead pixel is determined, the dead pixel signal is compensated for. One method of compensating for a dead pixel signal is to replace it with the pixel signal from a previous pixel, or an average of the previous and following pixels.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
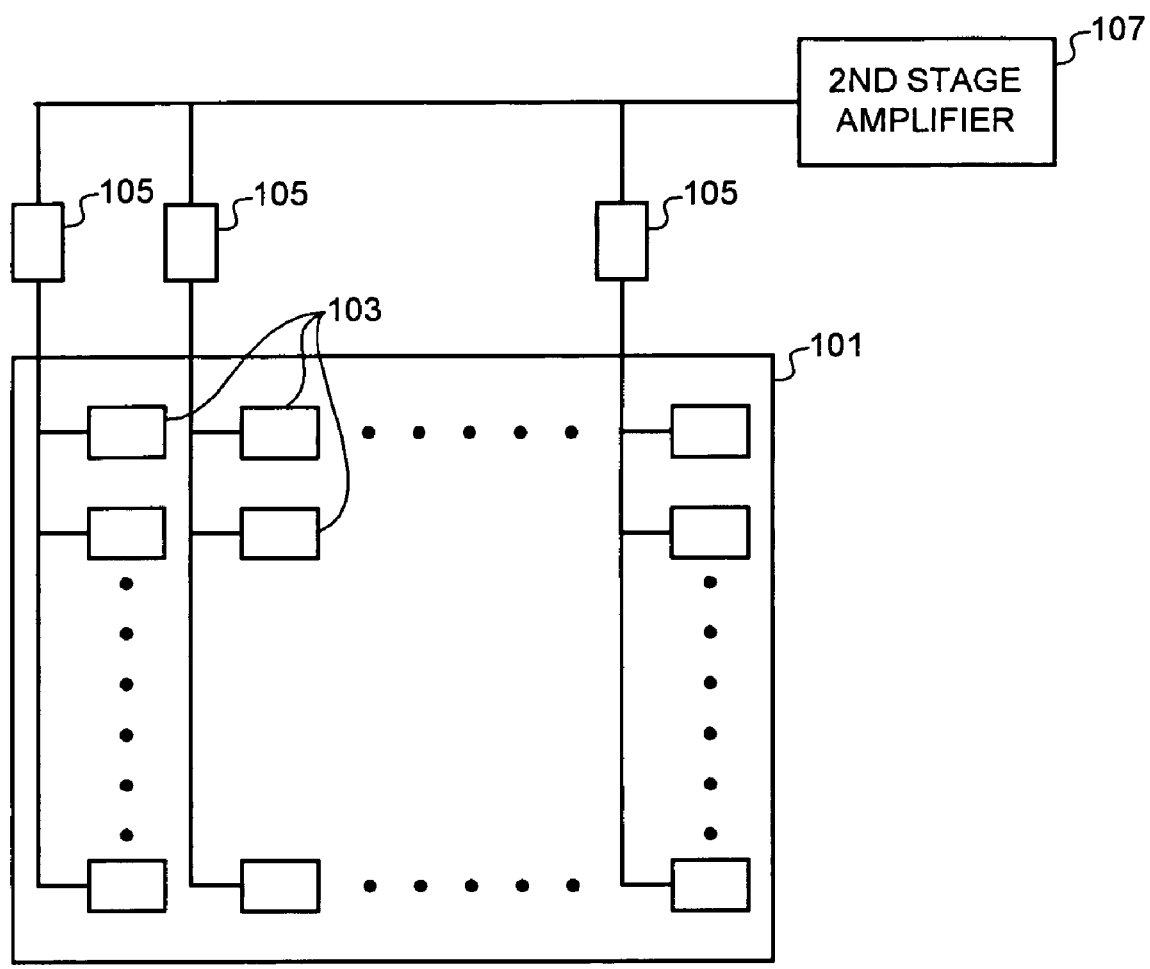
FIG. 1 is a schematic diagram of a pixel array of a CMOS imaging sensor.

With reference to FIG. 1, an architecture for a CMOS imaging array 101 includes a rectangular matrix of pixels 103. The number of pixels in the horizontal or x-direction and the number of pixels in the vertical or y-direction constitute the resolution of the imaging array 101. Each of the pixels 103 in a vertical column routes its signal to a single charge amplifier 105.

The retrieval of information from the pixels 103 follows the well-known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be further processed.

Figure 2:
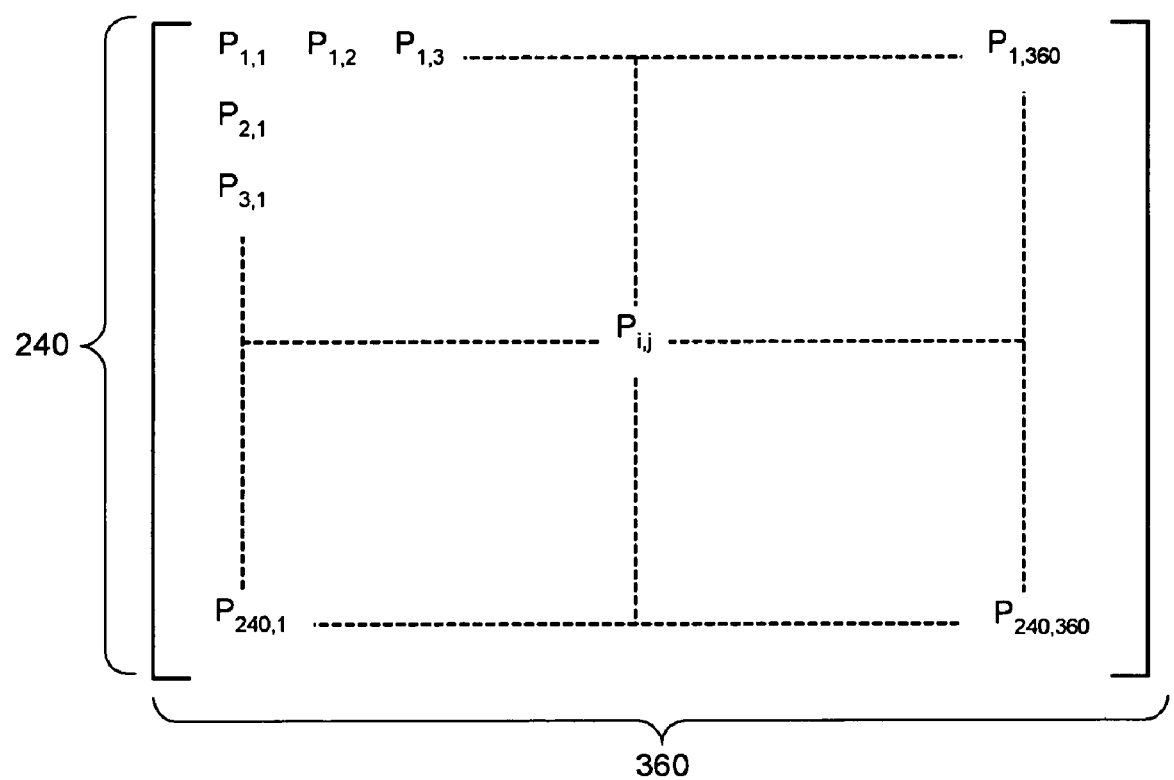
FIG. 2 is a schematic diagram illustrating a pixel referencing scheme for a matrix of pixels of a CMOS imaging sensor.

FIG. 2 illustrates a schematic representation of a pixel referencing scheme for referencing the pixels of the pixel array. As seen in the example of FIG. 2, the referencing scheme is a matrix having dimensions of 240×360. It will be understood that much larger matrixes may be used, and that the matrix shown in FIG. 2 is for purposes of illustration only. Each coordinate of the matrix P(i,j) corresponds to a pixel. For purposes of the present invention, subscripts "i" and "j" are used to identify the particular pixel in the frame.

Figure 3:
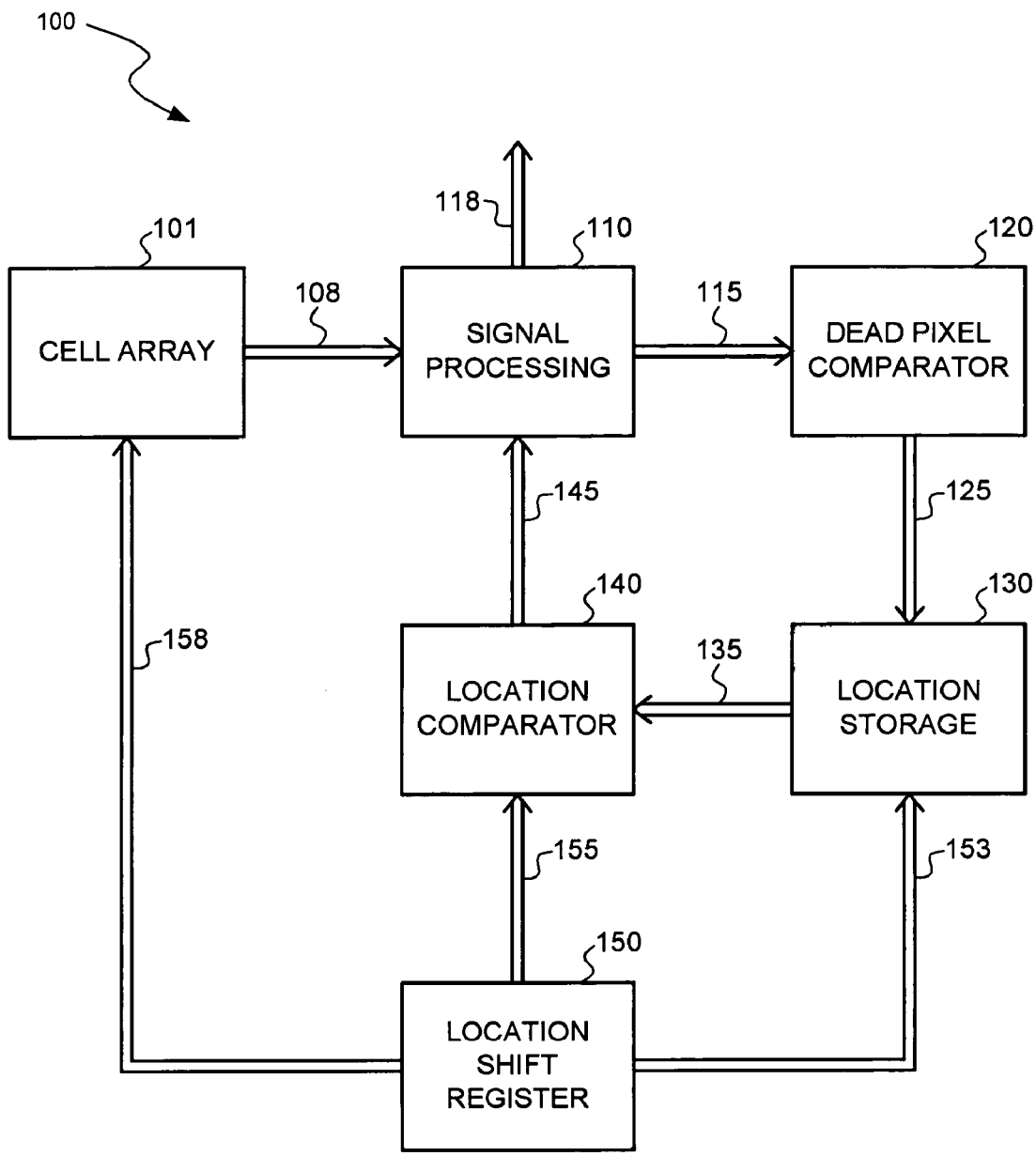
FIG. 3 is a block diagram of a CMOS imaging sensor including dead pixel correction circuitry formed in accordance with the present invention.

FIG. 3 illustrates a block diagram of a CMOS image sensor with circuitry for correcting for dead pixels according to the present invention. As illustrated in FIG. 3, the CMOS image sensor 100 includes a cell array 101 that outputs pixel signals on lines 108 to signal processing circuitry 110. Signal processing circuitry 110 outputs initial dead pixel processing signals on lines 115 to a dead pixel comparator 120, and thereafter outputs normal image processing signals on lines 118. Dead pixel comparator 120 outputs dead pixel location signals on lines 125 to location storage circuitry 130. Location storage circuitry 130 outputs dead pixel location signals on lines 135 to a location comparator 140. Location comparator 140 outputs dead pixel indication signals on lines 145 to signal processing circuitry 110. A location shift register 150 outputs location signals on lines 153 to location storage circuitry 130, outputs location signals on lines 155 to location comparator 140, and also outputs location signals on lines 158 to cell array 101.

The circuitry of FIG. 3 generally operates in the following manner. When the CMOS image sensor 100 is first turned on, or is otherwise initialized, location shift register 150 indicates digital pixel coordinates (according to location storage numbers that correspond to a referencing scheme such as that shown in FIG. 2) as the pixel signals from cell array 101 are read out by signal processing circuitry 110. As will be described in more detail below, if an EPROM storage circuit or similar device is not used to store the dead pixel locations, the dead pixels will need to be scanned each time the image sensor is powered on. To determine the location of any dead pixels during the initialization phase, the signal processing circuitry 110 initially provides the first set of pixel signals to dead pixel comparator 120. A detailed description of one manner in which the dead pixel comparator 120 may operate is described in a pending U.S. patent application titled "Method for Correcting False Spikes in a MOS Imaging Array," Ser. No. 08/747,902, filed Nov. 14, 1996, which is commonly assigned and hereby incorporated by reference.

In the present invention, the general process for determining dead pixels is to first precharge the cell array 101 with a fixed voltage. Then the entire array is shielded from light, and the pixels of the array are read sequentially by the signal processing circuitry 110. During this process, the dead pixel comparator 120 determines if each pixel is a dead pixel. When a dead pixel is determined, its location from location shift register 150 is then digitally stored in location storage circuitry 130. Once the entire cell array 101 has been read out, all of the dead pixel locations will have been determined and stored in location storage circuitry 130.

After the initial dead pixel location process is complete, normal image processing can begin. During normal image processing, location shift register 150 indicates digital pixel location numbers (corresponding to a referencing scheme such as that shown in FIG. 2) as the pixel signals from cell array 101 are read out to signal processing circuitry 110. Location shift register 150 also outputs the current pixel location number to location comparator 140. Location comparator 140 compares the current pixel location number to see if it matches a dead pixel location number as stored in location storage circuitry 130. If location comparator 140 determines that the current pixel corresponds with a dead pixel location, then location comparator 140 outputs a dead pixel indication signal to signal processing circuitry 110.

Signal processing circuitry 110 receives the pixel signals from each pixel of the array 101, and as each pixel is read out, the signal processing circuitry 110 determines whether a dead pixel indication signal is being received from location comparator 140. If the signal processing circuitry 110 does not receive a signal from location comparator 140 indicating that the current pixel being processed corresponds to a dead pixel, then signal processing circuitry 110 outputs the pixel signal as part of the normal image signal on lines 118. If, however, the signal processing circuitry 110 receives a signal from the location comparator 140 that indicates that the current pixel being processed does correspond to a dead pixel, then the signal processing circuitry 110 instead compensates for the signal from the dead pixel.

In the preferred embodiment, the signal processing circuitry 110 may compensate for a dead pixel by repeating the pixel signal from the previously read out pixel. The signal from the previous pixel is easily repeated because it is still contained in signal processing circuitry 110 from the previous pixel processing. In addition, more complex compensation methods may also be used, such as replacing the dead pixel value with an average of the previous and following pixel values. Also, in some embodiments, an external storage circuit may make more memory available to store large dead pixel location storage numbers.

Figure 4A:
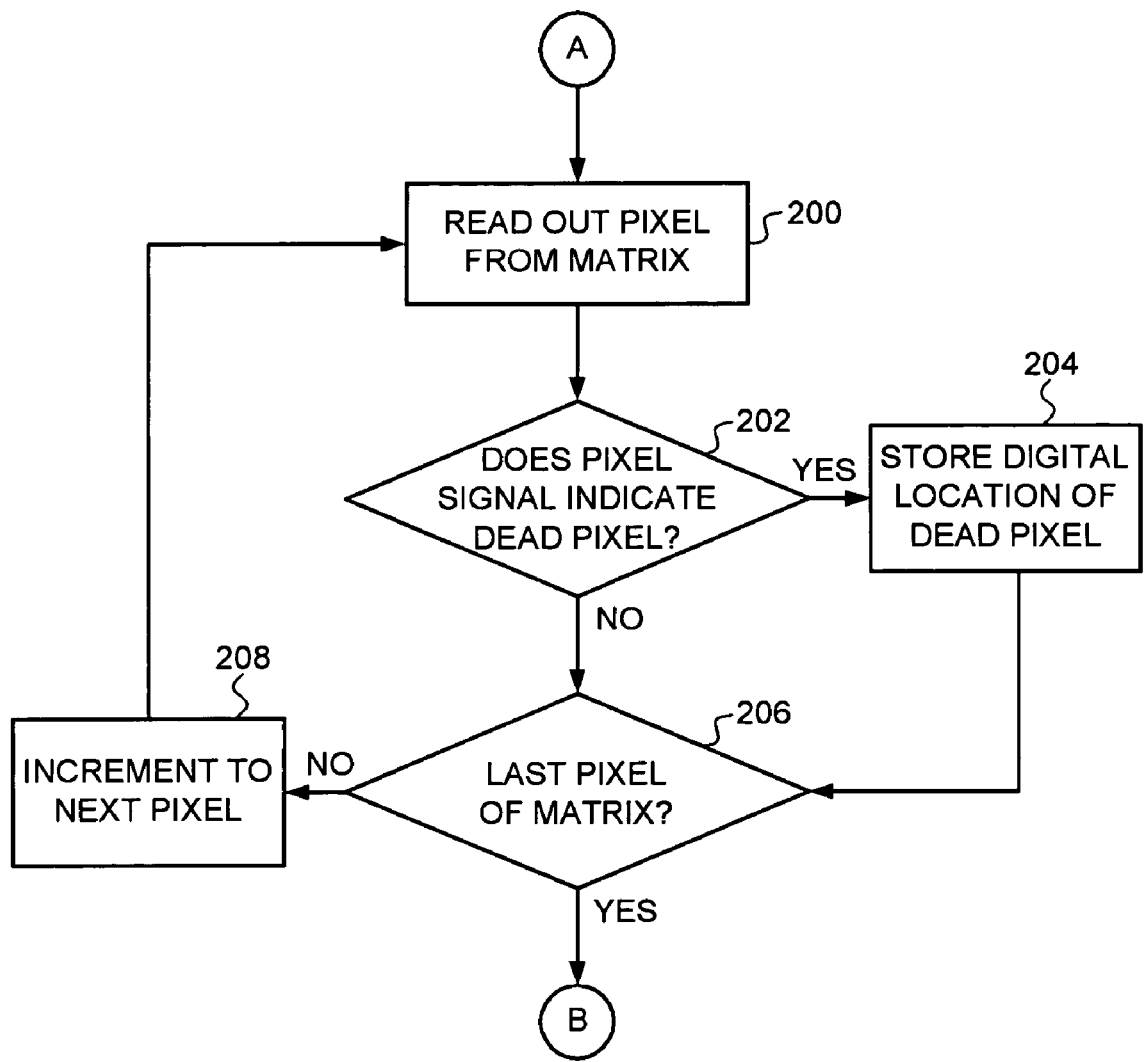
FIG. 4A is a flow diagram illustrating the initial dead pixel determination and location storage method of the present invention.
Figure 4B:
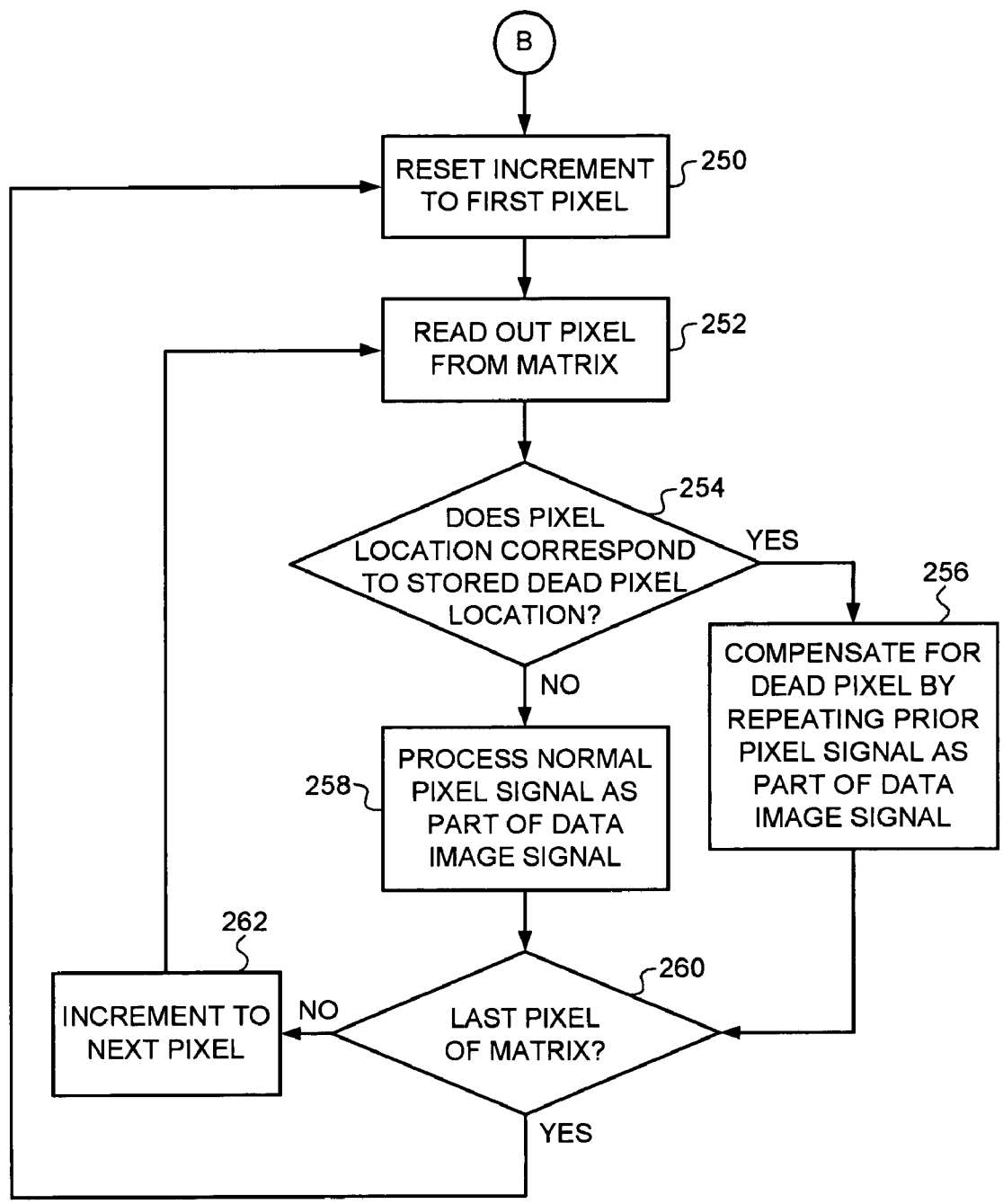
FIG. 4B is a flow diagram illustrating the image signal processing and dead pixel correction method of the present invention.

FIGS. 4A and 4B are flow diagrams illustrating the general method of operation for the circuitry of FIG. 3. As shown in FIG. 4A, the initial dead pixel location process begins at a point "A." At a block 200, after the image sensor is powered on or otherwise initialized, the first pixel of the matrix is read out. At a block 202, a determination is made as to whether the pixel is a dead pixel. If the pixel is a dead pixel, the routine proceeds to a block 204, and if the pixel is not a dead pixel, the routine proceeds to a decision block 206. At block 204, the digital location of the dead pixel is stored, after which the routine proceeds to decision block 206.

At decision block 206, a determination is made as to whether the last pixel of the frame has been reached. If the last pixel of the frame has not been reached, then the routine proceeds to a block 208 where the routine increments to the next pixel of the frame, and returns to block 200 to read the next pixel from the pixel array. If the last pixel of the frame has been reached, then the routine proceeds to point "B," where normal signal processing may begin as described below for FIG. 4B.

As shown in FIG. 4B, from a point "B," the routine proceeds to block 250 where the incrementing is reset to the first pixel of the matrix. At a block 252, the pixel signal is read out from the pixel array. At a decision block 254, the routine determines whether the pixel location corresponds to the stored location of a dead pixel. If the pixel location corresponds to the stored location of a dead pixel, then the routine proceeds to a block 256, and if the pixel location does not correspond to the stored location of a dead pixel, then the routine proceeds to a block 258. At block 256, the routine compensates for a dead pixel by repeating the prior pixel signal as part of the image signal, and then proceeds to a decision block 260. At block 258, the routine processes the pixel signal as part of the normal image signal.

At decision block 260, the routine determines whether the last pixel of the frame has been reached. If the last pixel of the frame has not been reached, then the routine proceeds to block 262 where the routine increments to the next pixel, and then returns to block 252 for reading out the next pixel from the matrix. If at decision block 260 the routine determines that the last pixel of the frame has been reached, then the routine returns to block 250 to reset the location increment to the first pixel of the matrix.

The method of the present invention is advantageous over previous methods which did not digitally store the locations of dead pixels and which therefore had to determine the dead pixels every time the pixel array was read out. Thus, through use of the present invention the stored dead pixel locations only need to be determined once during the initial location process and can be corrected for thereafter during normal signal processing. This process is faster and more efficient, as less signal processing is required to determine the dead each time the pixel array is read out.

In addition, all of the circuitry shown in FIG. 3 may be fabricated as part of a single chip for the CMOS image sensor 100. As illustrated in FIG. 3, relatively simple processing circuitry allows for relatively small location storage circuitry 130 to be used, in that only the locations of the dead pixels need to be stored. Thus, the chip size of the CMOS image sensor 100 can be kept small while using the dead pixel correction method of the present invention. However, it will be understood that the location storage circuitry 130 could also be implemented in an off-chip format, such as through an external EPROM. Using an external EPROM, more memory would generally be available and more complicated system designs for the method of the present invention could be used. In addition, these types of memory could allow the dead pixel locations to remain in storage even when the image sensor was powered off, thus not requiring the initial dead pixel location process to be repeated every time the image sensor was powered on. However, it will also be understood that the dead pixel location process may be repeated at any time to update the dead pixel locations that are stored.

While the preferred embodiment of the invention has been illustrated and described, it will be appreciated that various changes can be made therein without departing from the spirit and scope of the invention. The present invention has been described in relation to a preferred embodiment and several variations. One of ordinary skill after reading the foregoing specification will be able to effect various other changes, alterations, and substitutions of equivalents without departing from the broad concepts disclosed. It is therefore intended that the scope of the letters patent granted hereon be limited only by the definition contained in the appended claims and equivalents thereof, and not by limitations of the embodiments described thereof.

The invention claimed is:

1. A MOS image sensor comprising:
   a pixel array formed from a plurality of pixels arranged in a matrix of rows and columns;
   location processing means for providing a digital location number for each pixel of the pixel array;
   signal processing circuitry for reading out signals from the pixel away and outputting processed pixel signals;
   dead pixel comparator circuitry for receiving the processed pixel signals from the signal processing circuitry and examining the processed pixel signals to see if they are indicative of dead pixels;
   location storage circuitry for receiving dead pixel information from the dead pixel comparator circuitry and for storing the digital location number generated by the location processing means for each dead pixel, wherein digital location numbers are stored in the location storage circuitry only for pixels that are determined to be dead pixels; and
   location comparator circuitry for comparing the digital location number of a pixel that is being processed by the signal processing circuitry with the stored digital location numbers of dead pixels to determine if the pixel that is being processed corresponds to a dead pixel, wherein the pixel away and the dead pixel comparator circuitry are formed on a single integrated circuit, wherein the location processing means comprises a location shift register for indicating the digital location number of each of the pixels to the pixel array, the location comparator circuitry, and the location storage circuitry.

2. The image sensor of claim 1, wherein the signal processing circuitry compensates for a dead pixel by repeating a pixel signal from a pixel that was read out prior to the dead pixel.

3. The image sensor of claim 1, wherein the signal processing circuitry compensates for a dead pixel by averaging the pixel signal from a pixel that was read out prior to the dead pixel signal from a pixel that is read out subsequent to the dead pixel.

4. The image sensor of claim 1, wherein the dead pixel comparator is initially activated when the image sensor is first powered on to examine the processed pixel signals from each pixel only once.

5. The MOS image sensor of claim 4, wherein the dead pixel comparator may be activated at later times to reexamine the processed pixel signals from each pixel so as to update the dead pixel digital location numbers stored in the location storage circuitry.

6. The image sensor of claim 1, wherein the location storage circuitry is coupled to an off chip storage area.

7. The image sensor of claim 1, wherein the pixel array, the signal processing circuitry, the location shift register and the dead pixel comparator circuitry are fabricated on a single MOS chip.

8. A CMOS image sensor comprising:
   a pixel array formed from a plurality of pixels arranged in a matrix of rows and columns;
   means for precharging the plurality of pixels to a fixed voltage;
   signal processing circuitry for reading out a signal from one of the plurality of pixels of the pixel array and outputting a processed pixel signal;
   location storage circuitry for storing location numbers only of dead pixels;
   location comparator circuitry for comparing the location number of a pixel that is being processed by the signal processing circuitry with the stored location numbers of dead pixels from the location storage circuitry to determine if the pixel that is being processed corresponds to a dead pixel;
   a location shift register for indicating a digital location number to the pixel array, the location comparator circuitry, and the location storage circuitry; and
   dead pixel comparator circuitry for receiving the processed pixel signals from the signal processing circuitry and examining the processed pixel signals to see if they are indicative of dead pixels, and for indicating when the location number of a pixel that is determined to be a dead pixel should be stored by the location storage circuitry, wherein the pixel array and the dead pixel comparator circuitry are formed on a single integrated circuit.

9. The CMOS image sensor of claim 8, wherein the pixel array, the signal processing circuitry, the location shift register and the dead pixel comparator circuitry are fabricated on a single CMOS chip.

* * * * *

UNITED STATES PATENT AND TRADEMARK OFFICE
CERTIFICATE OF CORRECTION

| | |
|---|---|
| PATENT NO. | : 7,522,200 B2 |
| APPLICATION NO. | : 10/684706 |
| DATED | : April 21, 2009 |
| INVENTOR(S) | : Kimble Dong |

It is certified that error appears in the above-identified patent and that said Letters Patent is hereby corrected as shown below:

Column 5, line 56, and column 6, line 6, "away" should be changed to --array--.

Signed and Sealed this
Eleventh Day of September, 2012

David J. Kappos
*Director of the United States Patent and Trademark Office*